UNITED STATES PATENT OFFICE.

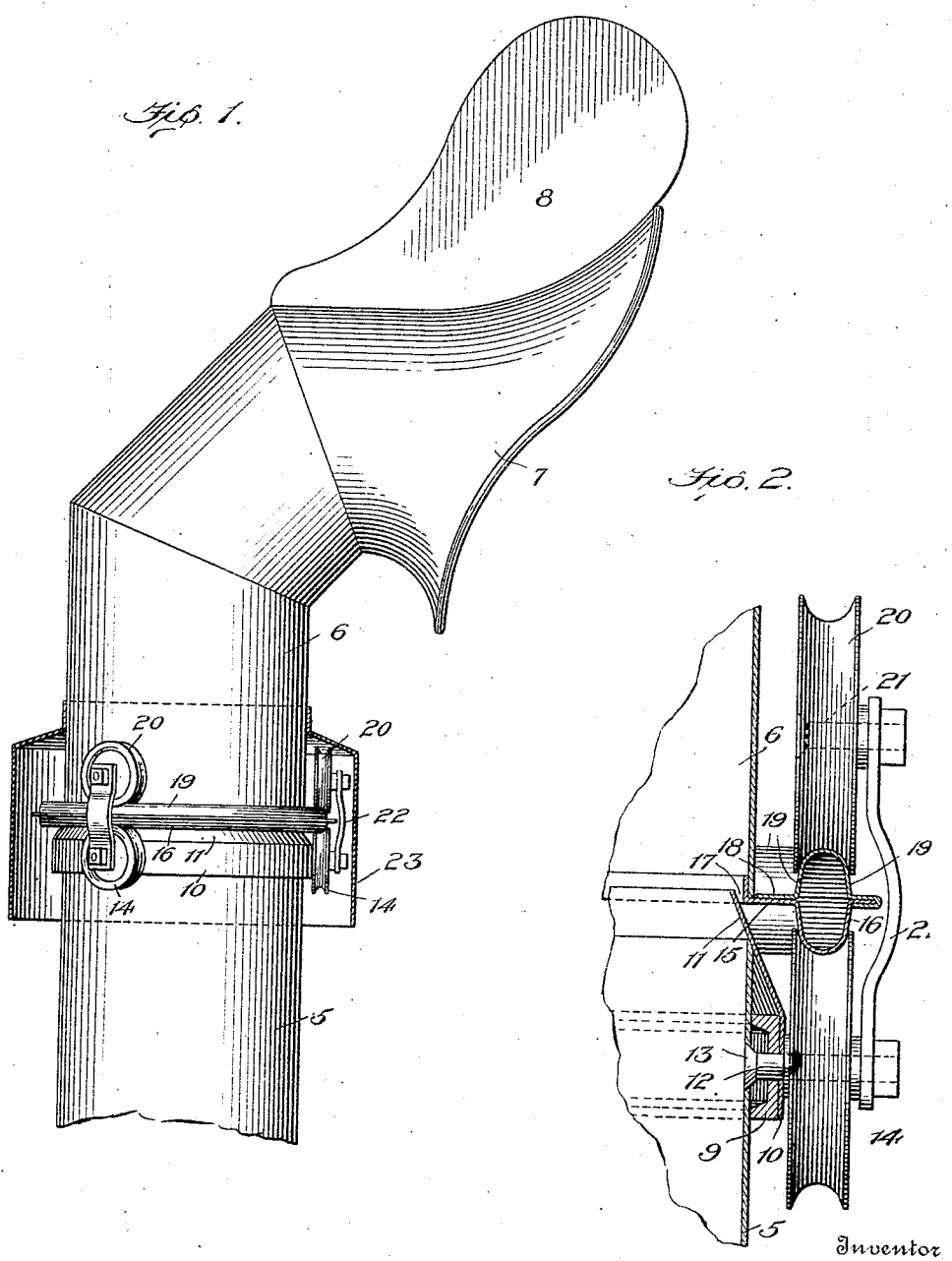

CLAUD P. LYLE, OF ATLANTA, GEORGIA.

VENTILATOR.

1,305,389.  Specification of Letters Patent.  Patented June 3, 1919.

Application filed April 17, 1918. Serial No. 229,064.

*To all whom it may concern:*

Be it known that I, CLAUD P. LYLE, citizen of the United States, and resident of Atlanta, in the county of Fulton and State of Georgia, have invented certain new and useful Improvements in Ventilators, of which the following is a specification, reference being had therein to the accompanying drawing.

This invention relates to ventilators such as are used upon large buildings and such as are especially adapted for use where dust and fiber often clog the air passage and also gather upon and interfere with the proper operation of working parts.

The principal objects are to avoid any such accumulation, to secure at a low cost a ventilator that, no matter how large it may be, swivels in a very light breeze.

In the accompanying drawings,

Figure 1 shows the ventilator in side elevation, the front half of an external protecting sleeve being broken away.

Fig. 2 is an enlarged section made by a vertical radial plane at one of the several sets of rollers seen in Fig. 1.

In these views, 5 represents a vertical ventilating pipe such as often projects through a roof, and 6 an upwardly extending pipe having its axis coincident with the axial line of the pipe 5 and provided with an open lateral extension 7 and with a vane 8. Slightly below its upper end, the pipe 5 is provided with a closely fitting heavy external ring 9 which may be of cast metal, and over the outer face of this ring is passed a closely fitting sleeve 10 having an upper rigidly connected conical frustum 11 which extends above and inwardly with respect to the upper margin of the pipe 5.

Through the wall of the pipe 5, ring 9 and sleeve 10 pass studs 12 brazed or otherwise fixed in place and preferably having their heads 13 flush with the interior surface of the pipe. Upon the projecting outer portion of each stud is revolubly mounted a roller 14, without novelty, but usually of non-corroding metal and provided with ball bearings so that it may rotate very easily.

The diameter of the pipe 6 is a little larger than that of the pipe 5, and from its lower end a metal web 15 extends horizontally outward as a broad annular flange having its middle portion bent downward to form an annular bead 16 fitting closely in the grooves of the rollers 14 and holding the pipe 6 above the pipe 5 with a narrow open annular space 17 between the two. Upon the flange 15 rests a web 18 having its outer marginal portion bent closely around the marginal portion of the flange 15 and having its middle portion bent upward to form an annular bead or rib 19 identically similar to the bead 16. The upper pipe, and both flanges 15, 18 are rigidly connected, preferably by brazing or soldering.

Upon the rib 19 rest closely fitting rollers 20 mounted like the rollers 14 and each having its shaft 21 connected by a link 22 to the outer end of the corresponding shaft 12 below, whereby the compound rib 16, 19 is closely held between the pairs of grooved rollers and the pipe 6 is allowed to rotate with great freedom but cannot move either vertically or laterally. Over all the rollers is placed a sleeve 23 (Fig. 1, only) which extends inward to the pipe 6, to which it is usually soldered so that no water can reach the working parts. It is to be noted that any water condensing on the inside of the upper pipe will run out through the passage 17 and that ordinarily the upward current in the pipes, which are internally quite unobstructed, will induce an upward current through the passage 17, preventing dust and fibers from passing out at this point, and even tending to suck out any dry matter that might accumulate on or about the rollers.

It is further to be noted that with only the ring 9 used for stiffening a sheet metal pipe sometimes six feet in diameter (a standard, "stock", size) the sleeve 23, the cone 11, the corrugated webs 15, 18 all incidentally impart extraordinary stiffness while adding nothing to or even reducing the ordinary weight and cost.

What I claim is:

1. The combination with a thin vertical pipe having near its upper end an external stiffening ring, of a tubular member covering said ring and having a frusto-conical portion extending inwardly over the upper end of said tube, radial rigid studs projecting outwardly from the ring at intervals around its circumference, rollers mounted on the studs, respectively, an upper alining pipe spaced vertically from the frusto-conical member and provided with a concentric rigidly connected annular track in rib-and-groove engagement with and supported wholly by said rollers, and other rollers above the track preventing its lifting from the lower rollers.

2. The combination with a thin vertical pipe having near its upper end an external stiffening ring, of radial studs rigidly fixed in the ring, rollers mounted on the studs, respectively, an upper alining pipe provided near its lower end with a concentric annular track joined to the pipe by rigid connections and itself supported by, and in rib-and-groove engagement with, said rollers, and other rollers connected to said studs and preventing the track from rising from the rollers which support it.

3. The combination with a lower, vertical ventilating pipe having an external stiffening ring near its upper end, of a series of spaced rollers carried by said ring, an upper alining pipe having an outwardly extending flange of doubled sheet metal with the two webs bent oppositely to form an annular hollow track in rib-and-groove engagement with said spaced rollers, and a second set of corresponding rollers in like engagement with the upper side of said track and each vertically above and connected with the corresponding roller of the lower set.

In testimony whereof I hereunto affix my signature.

CLAUD P. LYLE.

Copies of this patent may be obtained for five cents each, by addressing the "Commissioner of Patents, Washington, D. C."